(12) United States Patent
Zajac et al.

(10) Patent No.: US 11,396,979 B2
(45) Date of Patent: Jul. 26, 2022

(54) 3D PRINTED MAZE IN PRESSURE REGULATING VALVE

(71) Applicant: Goodrich Corporation, Charlotte, NC (US)

(72) Inventors: Piotr Zajac, Wroclaw (PL); Tomasz Wański, Wroclaw (PL)

(73) Assignee: GOODRICH CORPORATION, Charlotte, NC (US)

(*) Notice: Subject to any disclaimer, the term of this patent is extended or adjusted under 35 U.S.C. 154(b) by 0 days.

(21) Appl. No.: 17/206,216

(22) Filed: Mar. 19, 2021

(65) Prior Publication Data
US 2021/0293387 A1 Sep. 23, 2021

(30) Foreign Application Priority Data
Mar. 20, 2020 (EP) .................................. 20461522

(51) Int. Cl.
*F16K 17/40* (2006.01)
*F17C 13/04* (2006.01)
(Continued)

(52) U.S. Cl.
CPC ............ *F17C 13/04* (2013.01); *F16K 17/403* (2013.01); *B33Y 80/00* (2014.12); *F16K 13/04* (2013.01); *F16K 17/16* (2013.01); *F16K 31/56* (2013.01); *F17C 2201/0109* (2013.01); *F17C 2201/056* (2013.01); *F17C 2201/058* (2013.01);
(Continued)

(58) Field of Classification Search
CPC .............. F17C 13/04; F17C 2205/0332; F17C 2205/0314; F17C 2205/0338; F17C 2205/0382; F17C 2201/0109; F17C 2201/056; F17C 2201/058;
(Continued)

(56) References Cited

U.S. PATENT DOCUMENTS 1,959,822 A * 5/1934 Greve ................... F16K 17/162
137/68.23
2,684,180 A 7/1954 Allen
(Continued)

FOREIGN PATENT DOCUMENTS

| DE | 102006027057 B3 | 2/2008 |
|----|-----------------|--------|
| GB | 372895 A | 5/1932 |
| WO | 2019075255 A1 | 4/2019 |

OTHER PUBLICATIONS

Extended European Search Report for International Application No. 20461522.3 dated Jun. 5, 2020, 5 pages.

*Primary Examiner* — Minh Q Le
(74) *Attorney, Agent, or Firm* — Cantor Colburn LLP

(57) ABSTRACT

A valve includes a valve body having a gas inlet and a gas outlet. The valve body has an internal circumferential wall defining a gas passageway between the gas inlet and gas outlet. The inlet of the valve body is connectable to a source of pressurized gas. The valve also includes a rupture disc provided adjacent said gas inlet, wherein the ruptured disc is configured to prevent flow of gas through said inlet when intact and to allow flow of gas through said inlet when ruptured. The valve includes ribs radially extending from the internal circumferential wall, said ribs extending longitudinally in the direction to the gas outlet and from the gas inlet in a maze-type pattern. The ribs may be formed in a printed pattern to form a maze with dead-ends.

14 Claims, 4 Drawing Sheets

(51) Int. Cl.
*B33Y 80/00* (2015.01)
*F16K 31/56* (2006.01)
*F16K 17/16* (2006.01)

(52) U.S. Cl.
CPC ............... *F17C 2203/0617* (2013.01); *F17C 2205/0314* (2013.01); *F17C 2205/0332* (2013.01); *F17C 2205/0338* (2013.01); *F17C 2205/0382* (2013.01)

(58) Field of Classification Search
CPC .......... F17C 2203/0617; F16K 17/403; F16K 17/16; F16K 13/04; F16K 31/56; B33Y 80/00
USPC ................................ 137/68.19, 68.21, 68.23
See application file for complete search history.

(56) References Cited

U.S. PATENT DOCUMENTS

| | | | | |
|---|---|---|---|---|
| 2,856,096 | A * | 10/1958 | Bruce | F17C 13/123 220/89.4 |
| 3,109,553 | A * | 11/1963 | Fike | F16K 17/403 220/89.2 |
| 3,435,984 | A * | 4/1969 | Damiani | F16K 17/162 220/89.2 |
| 3,966,226 | A * | 6/1976 | Roth | B60R 21/08 222/5 |
| 4,245,749 | A * | 1/1981 | Graves | F16K 17/16 220/663 |
| 4,590,957 | A * | 5/1986 | McFarlane | F16K 17/16 220/89.2 |
| 5,191,990 | A * | 3/1993 | Fritts | F17C 13/12 220/88.1 |
| 5,368,180 | A * | 11/1994 | Farwell | F16K 17/162 220/89.2 |
| 5,673,731 | A * | 10/1997 | Green | B60R 21/272 141/3 |
| 5,673,934 | A * | 10/1997 | Saccone | F17C 13/06 280/736 |
| 5,906,394 | A * | 5/1999 | Van Wynsberghe | B60R 21/268 222/5 |
| 7,226,078 | B2 * | 6/2007 | Green | B60R 21/268 137/68.25 |
| 7,950,409 | B2 * | 5/2011 | Stokes | E21B 34/063 137/68.21 |
| 10,179,561 | B2 | 1/2019 | Jung et al. | |
| 2002/0017319 | A1 | 2/2002 | Hintzman et al. | |
| 2005/0061404 | A1 * | 3/2005 | Erike | C21D 8/10 148/333 |
| 2005/0121073 | A1 * | 6/2005 | Carroll | F16K 17/16 137/68.23 |
| 2008/0289694 | A1 * | 11/2008 | Edwards | F16K 31/0651 137/70 |
| 2015/0107684 | A1 * | 4/2015 | Forkl | F17C 13/04 137/68.23 |
| 2018/0117219 | A1 * | 5/2018 | Yang | A61F 2/82 |
| 2018/0142533 | A1 | 5/2018 | Joerpeland et al. | |
| 2018/0313455 | A1 * | 11/2018 | Said | F16K 17/1606 |
| 2019/0093776 | A1 * | 3/2019 | Ligeti | F16K 17/1606 |
| 2019/0101284 | A1 | 4/2019 | Benning et al. | |
| 2020/0018408 | A1 | 1/2020 | Czarnecki et al. | |
| 2021/0181770 | A1 * | 6/2021 | Zajac | F17C 13/04 |

\* cited by examiner

GAS FLOW

3D PRINTED MAZE IN PRESSURE REGULATING VALVE

FOREIGN PRIORITY

This application claims priority to European Patent Application No. 20461522.3 filed Mar. 20, 2020, the entire contents of which is incorporated herein by reference.

FIELD

The present disclosure relates to valves and methods of manufacturing such valves. The valves may be regulating valves or other types of valves.

BACKGROUND

Some high pressure pneumatic valves use bursting discs that act as non-reclosing pressure relief parts. Bursting discs are one-time-use membranes that are designed to fail at a predetermined differential pressure. Typically such membranes are made out of metal. A problem associated with such bursting discs is that upon rupture, debris from the disc can be carried by gas flow into the valve interior. Membrane debris may affect the functionality of valve parts such as the pressure regulator. It is even possible for these debris to travel to other parts of the valve such as the inflation system which can cause unpredicted damage. It is therefore desirable to provide a valve with bursting disc that avoids the problems of disc debris being carried into the valve. The examples provided herein therefore aim to overcome these problems.

SUMMARY

A pneumatic valve is described herein comprising a valve body having a gas inlet and a gas outlet, the valve body providing a gas passageway between the gas inlet and gas outlet; a source of pressurized gas connected to said inlet; a rupture disc provided between said gas inlet and said source of pressurized gas to prevent flow of said gas from said source through said inlet when intact and to allow flow of said gas from said source through said inlet when ruptured; wherein said passageway within said valve body has an internal circumferential wall, said wall comprising ribs provided thereon, said ribs extending longitudinally in the direction of the gas outlet and from the gas inlet.

In any of the examples described herein, at least one of said ribs may comprise a single branch at a first end that is closest to said outlet which forks into two branches at an end of the rib that is closest to the inlet to thereby form a dead end.

In any of the examples described herein, said ribs may be formed by an additive manufacturing technique.

In any of the examples described herein, the valve body 12 may be formed by an additive manufacturing technique.

In any of the examples described herein, the valve may further comprise an engagement sleeve slidably mounted within the valve body, wherein the engagement sleeve is movable between a retracted position and an extended position, and wherein, when in the extended position, the engagement sleeve engages the rupture disc and prevents it from rupture.

In any of the examples described herein, the valve may further comprise an engagement sleeve slidably mounted within the valve body, wherein the engagement sleeve is movable between a retracted position and an extended position, and wherein, when in the retracted position, the engagement sleeve does not engage the rupture disc and the engagement sleeve, and the engagement sleeve is positioned so that the only path through the gas passageway is through the paths formed by the ribs.

A method for manufacturing a pneumatic valve comprises providing a valve body having a gas inlet and a gas outlet, the valve body providing a gas passageway between the gas inlet and gas outlet; connecting a source of pressurized gas to said inlet; providing a rupture disc between said gas inlet and said source of pressurized gas to prevent flow of said gas from said source through said inlet when intact and to allow flow of said gas from said source through said inlet when ruptured; wherein said passageway within said valve body has an internal circumferential wall, and wherein said method further comprises forming ribs on said internal circumferential wall so that said ribs extend longitudinally in the direction of the gas outlet from the gas inlet.

In any of the examples described herein, said ribs may form a pattern and the method may further comprise forming a dead end in said rib pattern by forming at least one of said ribs so that it comprises a single branch at a first end that is closest to said outlet, and so that it forks into two branches at an end of the rib that is closest to the inlet.

An alternative method for manufacturing a pneumatic valve is described herein and comprises providing a valve body having a gas inlet and a gas outlet. The valve body has an internal circumferential wall defining a gas passageway between the gas inlet and gas outlet. The method further includes forming ribs radially extending from the internal circumferential wall and extending longitudinally in the direction to the gas outlet and from the gas inlet to form a maze-type pattern. The method further includes providing a rupture disc adjacent said gas inlet. The rupture disc is positioned to prevent flow of gas through said inlet when it is intact. When the rupture disc is ruptured, it allows the flow of gas through said inlet.

The step of forming the ribs may further comprise forming a dead end in the maze-type pattern by forming at least one of said ribs so that it comprises a single branch at a first end that is closest to said outlet, and so that it forks into two branches at an end of the rib that is closest to the inlet.

The method may further comprise connecting a source of pressurized gas to said inlet. The rupture disc is positioned between the source of pressurized gas and the inlet to prevent flow of gas from the source of pressurized gas through said inlet when intact and to allow flow of said gas from said source of pressurized gas through said inlet when ruptured.

In any of the examples described herein, said step of forming said ribs may be performed using an additive manufacturing technique.

In any of the examples described herein, said step of forming said valve body may be performed using an additive manufacturing technique.

In any of the examples described herein, the method may further comprise slidably mounting an engagement sleeve within the valve body, wherein the engagement sleeve is movable between a retracted position and an extended position, and wherein, when in the extended position, the engagement sleeve engages the rupture disc and prevents it from rupture.

In any of the examples described herein, the method may further comprise slidably mounting an engagement sleeve within the valve body, wherein the engagement sleeve is movable between a retracted position and an extended position, and wherein, when in the retracted position, the engagement sleeve does not engage the rupture disc and the engagement sleeve is positioned so that the only path through the gas passageway is through the paths formed by the ribs.

BRIEF DESCRIPTION OF THE DRAWINGS

Certain embodiments of the present disclosure will now be described in greater detail by way of example only and with reference to the accompanying drawing in which:

FIG. 2b shows the patterned rib structure on the internal walls of the pressure regulating valve of FIGS. 1 and 2a.

DETAILED DESCRIPTION

Described herein is a pneumatic valve 6 with a rupture disc or membrane 32 (i.e. a disc or membrane that is configured to rupture) wherein the internal chamber of the valve body 12 has a ribbed structure that may be an additive printed maze 50 provided on the internal walls.

Figure 1:
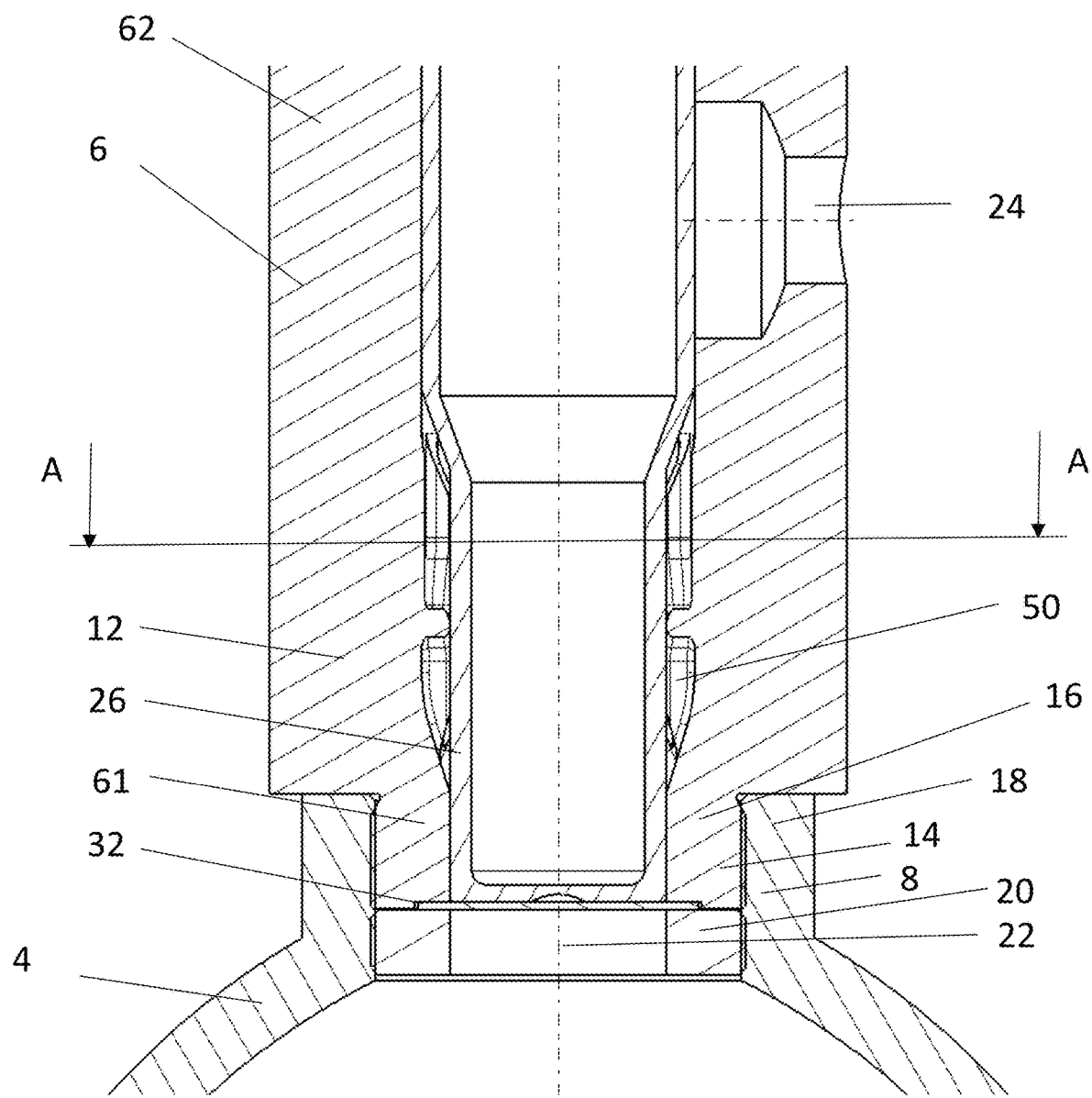
FIG. 1 shows a pressure regulating valve with a rupture disc and internal ribbed pattern.

With reference to FIG. 1, a pneumatic valve 6 is shown. The pneumatic valve 6 comprises a valve body 12 having a hollow interior, the valve body 12 extending from a first end 61 to a second end 62. The first end 61 of the valve body 12 may be connected to a source 4 of high pressure gas. In this example, the source 4 of high pressure gas is a pressurised cylinder having a threaded neck 8 which receives a protrusion located at the first end 61 of the valve housing 12. Other means of providing a high pressure gas may also be used, however, and the examples are not limited to this. In order to connect with the source 4 of high pressure gas, the valve body 12 may comprise a connect mechanism for connecting to the high pressure source. In this example, the connect mechanism for connecting comprises a threaded outer surface 14, located on the protrusion, for threaded engagement with the threaded neck 8 of the pressurised cylinder 4. The valve body 12 further comprises a shoulder 16 that extends radially outwardly from the protrusion. The shoulder 16 is configured for axial contact and engagement the upper end 18 of the threaded neck 8 of the pressurised cylinder 4 when the valve body 12 and pressurised gas cylinder 4 are connected.

A seal, for example a nut 20, may be arranged between the valve body 12 and the threaded neck 10 of the pressurised gas cylinder 4 to prevent escape of pressurised gas from around the valve body 12.

In some examples, the valve body 12 may be formed as a one-piece body which may be made, for example, by additive manufacturing or casting. Additive manufacturing is particularly advantageous as it allows for intricately shaped passages and features to be manufactured in a more simplified manner than before. In other examples, the valve body 12 may be constructed from a plurality of components suitably joined together and may be made by other techniques.

The valve body 12 further comprises a gas inlet 22 at its first end 61 and a gas outlet 24 at or near its second end 62. The hollow chamber within the valve body 12 provides a passageway for gas to travel from the inlet 22 to the outlet 24.

The pneumatic valve 6 further comprises a rupture disc or membrane 32 that is positioned to prevent flow of gas through gas inlet 22 and into the valve body 12. When the valve body 12 is connected to a source of pressurized gas 4, the rupture disc 32 can be positioned between the source 4 and the gas inlet 22. The rupture disc or membrane 32 may thereby be configured to block the gas inlet 22 so that pressurised gas from the source 4 is prevented from entering the inner chamber of the valve body 12 before it is ruptured. The rupture disc 32 is positioned between the first end of the pneumatic valve 6 and the nut 20 as shown in FIG. 1. The nut 20 may be arranged to retain the rupture disc 32 in its position.

When the rupture disc is broken, the gas inlet 22 is in fluid communication with the source 4 of high pressure gas. The gas outlet 24 is provided towards the second end 62 of the pneumatic valve 6. In this example the pneumatic valve 6 has a cylindrical shape and the outlet comprises a port that is provided so as to extend through the sidewall of the pneumatic valve 6. Other shapes may be envisaged, however.

The rupture disc 32 may be made from a material such as aluminium, or other materials, as are known in the art.

In some examples, the rupture disc 32 may be retained in its original position (i.e. prior to rupture) by use of an engagement sleeve 26. The engagement sleeve 26 is slidably mounted within the valve body 12 for movement between a retracted position, wherein the sleeve is away from, and not in contact with, the rupture disc 32, and an extended position, wherein the sleeve is in contact with the rupture disc 32. When the engagement sleeve 26 is in the extended position, it therefore engages the rupture disc 32, as shown in FIG. 1. The engagement sleeve 26 is configured such when it is in the extended position, the force exerted by the engagement sleeve 26 on the rupture disc 32 is balanced by the pressure exerted by the high pressure gas from gas cylinder 4 on the rupture disc 32. The rupture disc 32 therefore stays intact.

In order for gas to flow through the center of the hollow valve body 12 of the pneumatic valve 6, the engagement sleeve 26 is moved to the retracted position so that the engagement sleeve 26 is no longer in contact with the rupture disc 32. The engagement sleeve 26 therefore no longer counteracts the pressure on the rupture disc 32 exerted by the high pressure gas from the gas cylinder 4. This causes the rupture disc 32 to rupture. This enables gas from the gas cylinder 4 to enter the valve body 12 through the gas inlet 22. A problem associated with known pneumatic valves that rely upon rupture of a rupture disc, however, is that fragments of the rupture disc can be carried into the valve body and can block the outlet port of the valve body.

Unlike known pneumatic valves, however, the valve body 12 of the pneumatic valves 6 described herein provide a mechanism for preventing the fragments of the rupture disc 32 from blocking the pathway within the valve body 12.

Figure 2A:
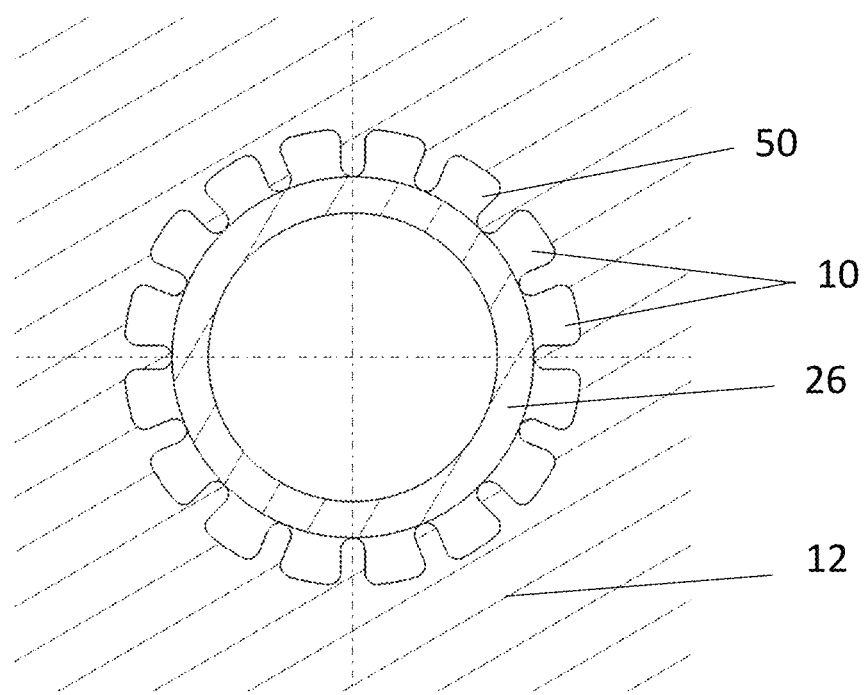
FIG. 2a shows a cross section of the valve of FIG. 1 as taken along the line A-A.
Figure 2B:
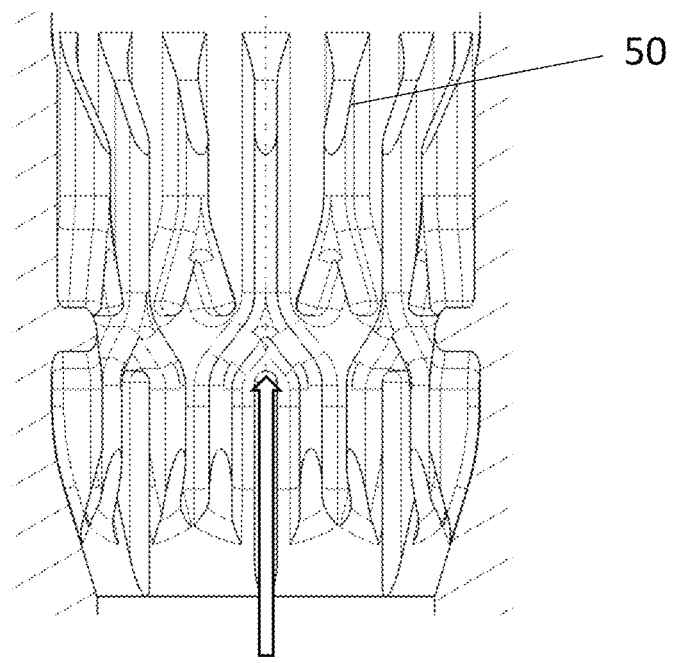

In some examples, as shown in and described in greater detail with respect to FIGS. 2a and 2b, the comprises ribs formed in a maze-type pattern to create a maze 50 on the internal circumferential wall surface (of the valve body 12) that defines the hollow chamber, or passageway within the valve body 12. In some examples, this maze 50 is provided only closest to the inlet 22 and in other examples the maze 50 is provided on the entire internal circumferential surface of the valve body 12. In other examples, the maze 50 is provided so as to extend at least partially along the internal circumferential wall surface between the inlet 22 and the outlet 24. In some examples, these ribs may be formed by being additively printed on inner walls of the valve body 12. Other methods may also be used.

FIGS. 2a and 2b show a cross-sectional view of the pneumatic valve 6 of FIG. 1 taken along the line A-A in FIG. 1. As can be seen in this cross-section, the internal walls of the valve body 12 have an internal circumferential wall surface with ribs 10 formed thereon, wherein the ribs 10 extend radially inwards towards the central axis of the valve body 12. Prior to rupture of the disc 32, the engagement sleeve 26 is positioned adjacent these ribs 10. Once the engagement sleeve 26 is retracted and the disc 32 is ruptured, the passageway defined by the valve body 12 is still blocked by the engagement sleeve 26. The only route for gas travel into the valve body 12 is therefore through the maze 50. The fragments of the ruptured disc 32 will therefore travel in the direction of the outlet port 24 of the valve 6 and into and between the ribs 10.

Since the ribs 10 are formed in a maze-type pattern that is non-uniform and comprises dead-ends, (like in a maze), these fragments become trapped within these ribs 10 and are not able to travel to and block the outlet 24. The configuration and dimension of the ribs 10 can be adapted according to the shape and size of debris that is predicted to be formed by the rupturing of the disc 32.

As shown in FIG. 2a, the maze 50 may be formed from a plurality of ribs 10 that are orientated so as to extend substantially lengthwise (in the same direction of gas flow) from the inlet 22 and towards the outlet 24. The ribs 10 have bends and dead ends provided, however, to better catch and retain the fragments of ruptured discs.

FIG. 2b depicts one example of the configuration of the plurality of ribs 10 defining the maze 50. Some of the ribs of the plurality of ribs 10 may be configured such that they comprise a single branch on the end of the rib that is closest to the outlet 24 and may fork into two branches at the other end of the rib that is closest to the inlet 22. Described a different way, the ribs 10 may comprise two protruding branches that extend from a point closer to the inlet 22 and in the direction of the outlet 24 and converge into one branch at a point closer to the outlet 24. This therefore creates a dead end for the gas pathway between the ribs as shown in FIG. 2b. The ribs 10 may extend all the way inside the valve body 12, or in some examples, only part of the way.

Due to this, as the gas travels in the direction of the outlet 24, the fragments are directed in between these forked ribs 10 and caught at the dead end where the two branches join (i.e. the dead end). Each of the ribs of the plurality of ribs 10 may be aligned so that a plurality of open passages are formed between each of the ribs that allow the passage of gas.

Figure 3:
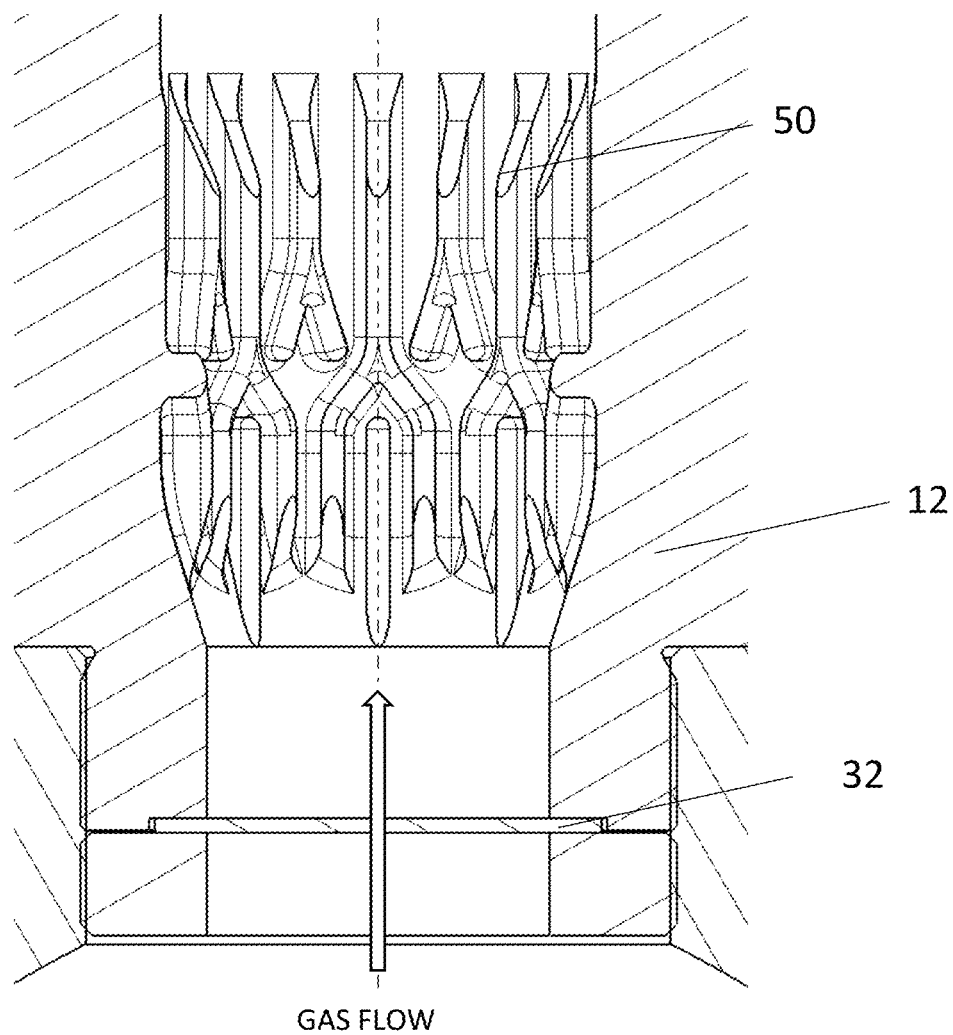
FIG. 3 shows the gas flow through the rib structure of the valves described herein.

FIG. 3 shows the passage of gas and debris from the rupture disc 32 through the valve body 12 and through the maze 50. As discussed above, the forks of the plurality of ribs 10 are configured so that the debris from the rupture disc 32 is trapped at the points where the branches of the ribs 10 combine into one branch to form a dead end.

As can be seen in FIG. 3 also, the forked sections of the ribs 10 that are positioned closer to the inlet 22 may be longer than the forked sections of the ribs 10 that are formed closer to the outlet 24.

Figure 4:
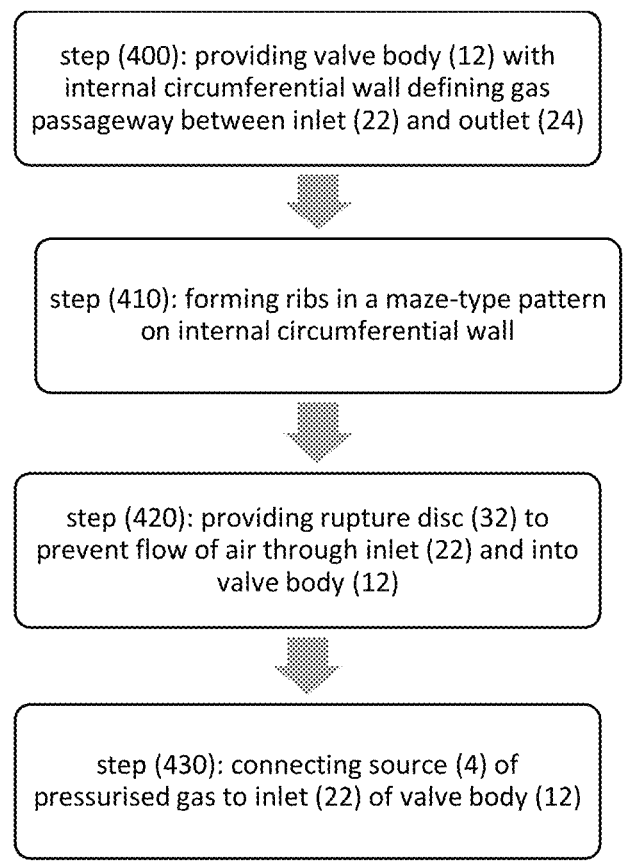
FIG. 4 shows a method to manufacture a valve with a patterned rib structure on its internal walls.

FIG. 4 shows a method 400 for manufacturing the pneumatic valve 6 described above. The first step 400 of the method includes providing a valve body 12 having a gas inlet 22 and a gas outlet 24. The valve body 12 has an internal circumferential wall defining a gas passageway between the gas inlet 22 and gas outlet 24. The second step 410 includes forming ribs 10 radially extending from the internal circumferential wall and extending longitudinally in the direction to the gas outlet 24 and from the gas inlet 22 to form a maze-type pattern (50). The third step 420 includes providing a rupture disc 32 adjacent said gas inlet 22. The rupture disc 32 is positioned to prevent flow of gas through said inlet 22 when it is intact. When the rupture disc 32 is ruptured, it allows the flow of gas through said inlet 22.

The method step 410 of forming the ribs 10 may further comprise forming a dead end in the maze type pattern 50 by forming at least one of said ribs 10 so that it comprises a single branch at a first end that is closest to said outlet 24, and so that it forks into two branches at an end of the rib that is closest to the inlet 22.

The method may further comprise a step 430 of connecting a source of pressurized gas 4 to said inlet 22. The rupture disc 32 is positioned between the source of pressurized gas 4 and the inlet 22 to prevent flow of gas from the source of pressurized gas 4 through said inlet 22 when intact and to allow flow of said gas from said source of pressurized gas 4 through said inlet 22 when ruptured.

The step 410 of forming the ribs 10 may be performed using an additive manufacturing technique. The step 400 of forming the valve body 12 may be performed using an additive manufacturing technique.

In any of the examples described herein, the method may further comprise a further step 440 of slidably mounting an engagement sleeve 26 within the valve body, wherein the engagement sleeve 26 is movable between a retracted position and an extended position, and wherein, when in the extended position, the engagement sleeve 26 engages the rupture disc 32 and prevents it from rupture.

The method may further comprise a further step 450 of slidably mounting the engagement sleeve 26 described above within the valve body, and the engagement sleeve may be movable between a retracted position and an extended position. In the retracted position, the engagement sleeve does not engage the rupture disc 32 and the engagement sleeve is positioned so that the only path through the gas passageway is through the paths formed by the ribs 10.

As mentioned above, this maze-type pattern 50 formed by ribs 10 may be achieved by the use of additive manufacturing. Although the additively manufactured maze 50 described herein has been described for use in a pneumatic valve, the use of an additively manufactured maze 50 in other instruments is also envisaged. For example, a maze 50 could be additively manufactured onto the interior passageways of hydraulic valves and filters.

The benefit of the maze 50 described herein is that it can prevent debris from the burst rupture disc 32 from reaching the interior of the valve 12. Unique to the solution of the maze 50 provided in the present embodiment is that no closed channels are printed. Because there are no closed channels, there is no need for removal of powder residue associated with 3D printing of closed passages. This is beneficial because powder removal can be complicated for relatively small structures.

Since the design of the current embodiment is suitable for additive manufacturing, a further benefit is that the maze 50 can be additively manufactured together with the valve body 12. This allows the manufacture of the valve body and the maze 50 to be carried out for less cost and time than if these components were manufactured separately and then joined together. Furthermore, since the maze 50 can be additively manufactured, the topology of the maze 50 can easily be adjusted and optimised in order to, for example, reduce the mass of material requested.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. A valve comprising:
a valve body having a gas inlet and a gas outlet, the valve body having an internal circumferential wall defining a gas passageway between the gas inlet and gas outlet, wherein the inlet of the valve body is connectable to a source of pressurized gas; and
a rupture disc provided adjacent said gas inlet, wherein the ruptured disc is configured to prevent flow of gas through said inlet when intact and to allow flow of gas through said inlet when ruptured;
wherein the valve body includes ribs radially extending from the internal circumferential wall, said ribs extending longitudinally in the direction to the gas outlet and from the gas inlet in a maze-type pattern.

2. The valve of claim 1, wherein at least one of said ribs comprises a single branch at a first end that is closest to said outlet which forks into two branches at an end of the rib that is closest to the inlet to thereby form a dead end.

3. The valve of claims 1, further comprising:
a source of pressurized gas connected to said inlet;
wherein the rupture disc is positioned to prevent flow of said gas from said source of pressurized gas through said inlet when intact and to allow flow of said gas from said source of pressurized gas through said inlet when ruptured.

4. The valve of claim 1, wherein said ribs are formed by an additive manufacturing technique.

5. The valve of claim 1, wherein the valve body is formed by an additive manufacturing technique.

6. The valve of claim 1, further comprising:
an engagement sleeve slidably mounted within the valve body, wherein the engagement sleeve is movable between a retracted position and an extended position, and wherein, when in the extended position, the engagement sleeve engages the rupture disc and prevents it from rupture.

7. The valve of claim 1, further comprising:
an engagement sleeve slidably mounted within the valve body, wherein the engagement sleeve is movable between a retracted position and an extended position, and wherein, when in the retracted position, the engagement sleeve does not engage the rupture disc and the engagement sleeve is positioned so that the only path through the gas passageway is through the paths formed by the ribs.

8. A method for manufacturing a valve, the method comprising:
providing a valve body having a gas inlet and a gas outlet, the valve body having an internal circumferential wall defining a gas passageway between the gas inlet and gas outlet;
forming ribs radially extending from the internal circumferential wall and extending longitudinally in the direction to the gas outlet and from the gas inlet to form a maze-type pattern; and
providing a rupture disc adjacent said gas inlet, wherein said rupture disc is configured to prevent flow of gas through said inlet when intact and to allow flow of gas through said inlet when ruptured.

9. The method of claim 8, wherein forming said ribs further comprises:
forming a dead end in said maze-type pattern by forming at least one of said ribs so that it comprises a single branch at a first end that is closest to said outlet, and so that it forks into two branches at an end of the rib that is closest to the inlet.

10. The method of claim 8, further comprising:
connecting a source of pressurized gas to said inlet;
wherein the rupture disc is positioned to prevent flow of said gas from said source of pressurized gas through said inlet when intact and to allow flow of said gas from said source of pressurized gas through said inlet when ruptured.

11. The method of claim 8, wherein forming said ribs is performed using an additive manufacturing technique.

12. The method of claim 8, wherein forming said valve body is performed using an additive manufacturing technique.

13. The method of claim 8, further comprising:
slidably mounting an engagement sleeve within the valve body, wherein the engagement sleeve is movable between a retracted position and an extended position, and wherein, when in the extended position, the engagement sleeve engages the rupture disc and prevents it from rupture.

14. The method of claim 13, further comprising:
slidably mounting an engagement sleeve within the valve body, wherein the engagement sleeve is movable between a retracted position and an extended position, and wherein, when in the retracted position, the engagement sleeve does not engage the rupture disc and the engagement sleeve is positioned so that the only path through the gas passageway is through the paths formed by the ribs.

* * * * *